(12) United States Patent
Cutler et al.

(10) Patent No.: US 7,869,810 B2
(45) Date of Patent: Jan. 11, 2011

(54) METHOD AND SYSTEM FOR COMPUTING AND DISPLAYING LOCATION INFORMATION FROM CROSS-CORRELATION DATA

(75) Inventors: Robert T. Cutler, Everett, WA (US); Mutsuya Li, Shoreline, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 776 days.

(21) Appl. No.: 11/114,314

(22) Filed: Apr. 25, 2005

(65) Prior Publication Data

US 2006/0250264 A1 Nov. 9, 2006

(51) Int. Cl.
*H04W 24/00* (2009.01)
(52) U.S. Cl. .............. 455/456.1; 455/456.2; 455/456.3; 455/566; 345/592; 345/593; 345/594
(58) Field of Classification Search ................. 455/440, 455/445, 446, 456.1–456.6, 457, 566; 345/592, 345/593, 594
See application file for complete search history.

(56) References Cited

U.S. PATENT DOCUMENTS

| | | | |
|---|---|---|---|
| 3,783,441 A | | 1/1974 | Slawsky |
| 5,327,144 A * | | 7/1994 | Stilp et al. ................. 342/387 |
| 6,201,499 B1 * | | 3/2001 | Hawkes et al. .............. 342/387 |
| 6,571,082 B1 * | | 5/2003 | Rahman et al. .......... 455/67.11 |
| 6,603,966 B1 * | | 8/2003 | Sheffield .................... 455/423 |
| 6,990,428 B1 * | | 1/2006 | Kaiser et al. ................. 702/150 |
| 2003/0008622 A1 * | | 1/2003 | Fernandez-Corbaton et al. . 455/68 |
| 2003/0017832 A1 * | | 1/2003 | Anderson et al. ........... 455/456 |
| 2003/0129996 A1 * | | 7/2003 | Maloney et al. ............. 455/456 |
| 2003/0131342 A1 * | | 7/2003 | Bates et al. ................. 717/125 |
| 2004/0027276 A1 * | | 2/2004 | Herman ..................... 342/181 |
| 2004/0229623 A1 * | | 11/2004 | Rappaport et al. .......... 455/446 |
| 2005/0184907 A1 * | | 8/2005 | Hall et al. ................... 342/387 |
| 2007/0010753 A1 * | | 1/2007 | MacAdam .................. 600/523 |

OTHER PUBLICATIONS

European Search Report dated Oct. 26, 2006.
Kevin J. Krizman, Thomas E. Biedka and Theodore S. Rappaport—"Wireless Position Location: Fundamentals, Implementation Strategies and Sources of Error"; May 4, 1997, Vehicular Technology Conference, 1997, IEEE 47th Phoenix, AZ, USA, May 4-7, 1997, New York, NY, USA, IEEE, US. pp. 919-923; XP010228977.

* cited by examiner

*Primary Examiner*—Ajit Patel
*Assistant Examiner*—Khai M Nguyen

(57) ABSTRACT

Two or more receivers in a plurality of receivers are selected and the signal data from each receiver obtained. A cross-correlation of signal data is computed for each receiver paring in the selected receivers. The results of each cross-correlation are then combined and mapped into a graphical indicator function. The graphical indicator function generates a visual representation of location information using the results of each cross-correlation computation. The visual representation is then displayed to a user. Additional location information may also be simultaneously displayed with the visual representation or upon command.

14 Claims, 8 Drawing Sheets

METHOD AND SYSTEM FOR COMPUTING AND DISPLAYING LOCATION INFORMATION FROM CROSS-CORRELATION DATA

BACKGROUND

Cross-correlation functions are widely accepted as a method for extracting signals from noise, and for establishing the relative timing between two different signals containing a common element. In geolocation applications, a series of samples representing a signal can be acquired from at least two different spatial locations. These samples can then be correlated against each other to determine time difference of arrival (TDOA) between each pairing of signals as observed at each location. Many techniques exist for extracting the TDOA from a cross-correlation, such as determining the time offset for which the cross-correlation function produces a peak amplitude. Other more advanced techniques have been developed to improve the TDOA estimate from the correlation data in the presence of distortion due to multi-path conditions. The goal of all of these techniques is to produce a single number representing the time shift, or TDOA between two signals. This numerical result, when combined with TDOA results from other pairings of receivers, can then be used to estimate the position of the signal source relative to the receivers. Many techniques exist for estimating position using estimated TDOAs.

Techniques that rely on improving the TDOA estimate, or the subsequent solution of location from the TDOA results, can produce poor or misleading estimates of location under multi-path conditions or when more than one signal is present. Moreover, in many instances, signals are not well behaved. That is they are of an unknown origin and can create interference. For RF signals, for example, an unknown emitter may create interference in a cellular network. Other unknown signals may represent a security threat or criminal activity. Frequent observations of these signals may not be possible, as the signals and the environment under which the signals exist may not be well understood and multiple signals may be present at the same time. In cross-correlation plots, multiple signals can result in multiple cross-correlation peaks, which may not be easily distinguishable from multi-path conditions.

SUMMARY

In accordance with the invention, a method and system for computing and displaying location information from cross-correlation data are provided. Two or more receivers in a plurality of receivers are selected and the signal data from each receiver obtained. A cross-correlation of signal data is computed for each receiver paring in the selected receivers. The results of each cross-correlation are then combined and mapped into a graphical indicator function. The graphical indicator function generates a visual representation of location information using the results of each cross-correlation computation. The visual representation is then displayed to a user. Additional location information may also be simultaneously displayed with the visual representation or upon command.

DETAILED DESCRIPTION

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
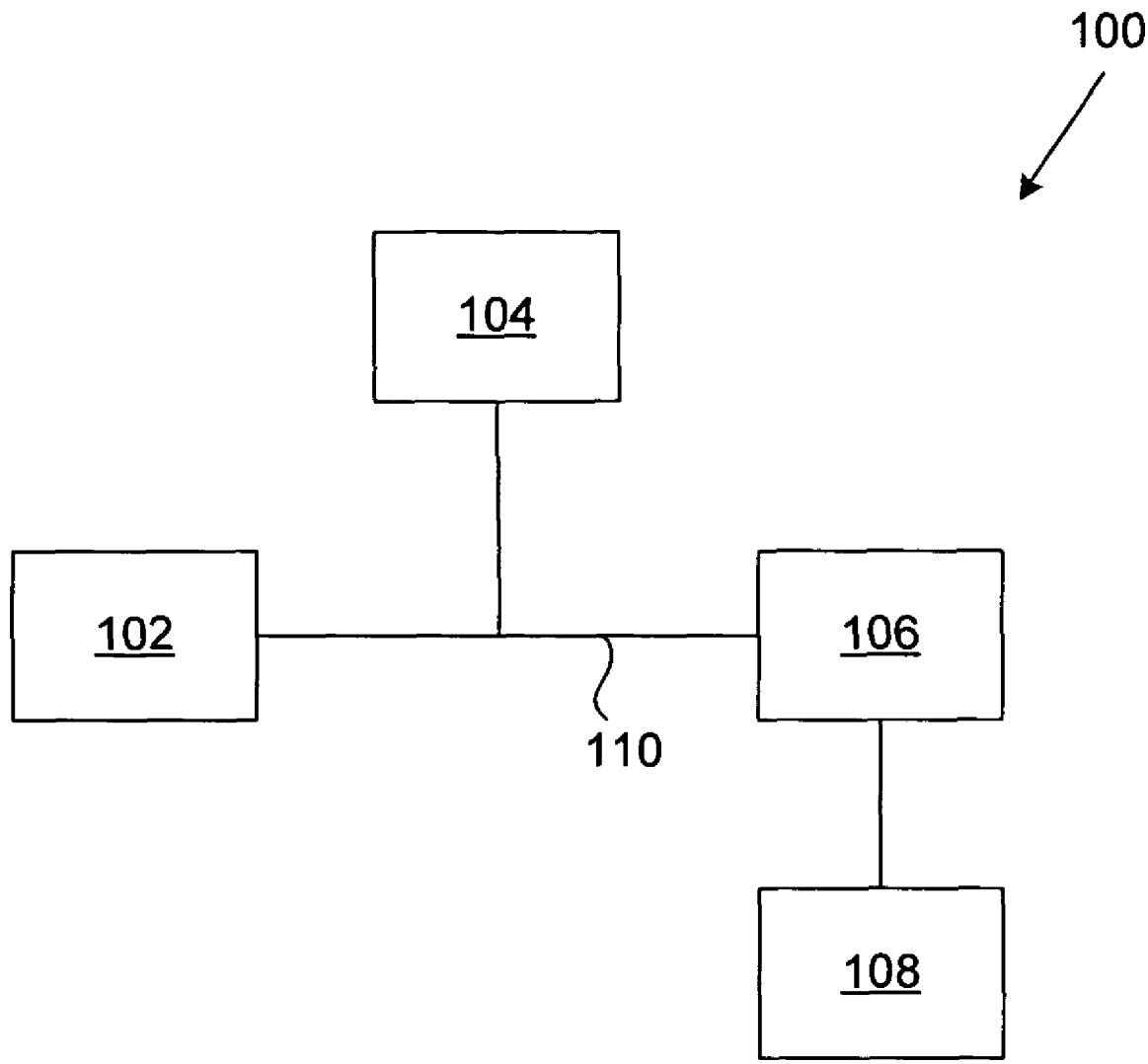
FIG. 1 is a diagrammatic illustration of a receiver system in an embodiment in accordance with the invention.

With reference to the figures and in particular with reference to FIG. 1, there is shown a diagrammatic illustration of a receiver system in an embodiment in accordance with the invention. Receiver system 100 includes receivers 102, 104 and computing device 106 connected to display 108 through connection 110. Connection 110 is implemented as a wireless connection in an embodiment in accordance with the invention. In other embodiments in accordance with the invention, connection 110 is implemented in any given manner consistent with the application, including, but not limited to, a wired connection or a combination of wired and wireless connections.

Receivers 102, 104 may be located within the same geographical area, such as a building, neighborhood, or city in an embodiment in accordance with the invention. In other embodiments in accordance with the invention, receivers 102, 104 may be separated by great distances, such as in multiple cities or states. Moreover, receivers 102, 104 may be positioned at various elevations, with one receiver indoors and other outdoors, and in different mediums, including free-space, air, and water.

Computing device 106 is implemented as a computer in an embodiment in accordance with the invention. In other embodiments in accordance with the invention, computing device 106 may be implemented as another receiver in system 100 or with two or more receivers in system 100. Moreover, embodiments in accordance with the invention are not limited to receiver systems having only two receivers. Any number of receivers may be used in other embodiments in accordance with the invention.

Receivers 102, 104 sample signal data and are implemented as RF receivers in an embodiment in accordance with the invention. For example, receivers 102, 104 may be implemented as two spectrum analyzers connected in a network. In other embodiments in accordance with the invention, receivers 102, 104 may be acoustic or optical receivers. For example, receivers 102, 104 may be implemented as two microphones connected to a digitizing sound card in a computing device. Receivers 102, 104 are synchronized to a common time in an embodiment in accordance with the invention. Synchronization may be achieved through a variety of techniques, including, but not limited to, global positioning system (GPS) or by communicating timing information between computing device 106 and receivers 102, 104.

Receivers 102, 104 receive a signal simultaneously observed at multiple locations in a geographical area. The signal may transmit through any medium capable of conducting a signal, such as earth, air, or water. Receivers 102, 104 transmit the sampled data to computing device 106, which computes a cross-correlation with the sampled data. Display 108 is used to display the results of the cross-correlation.

Figure 2A:
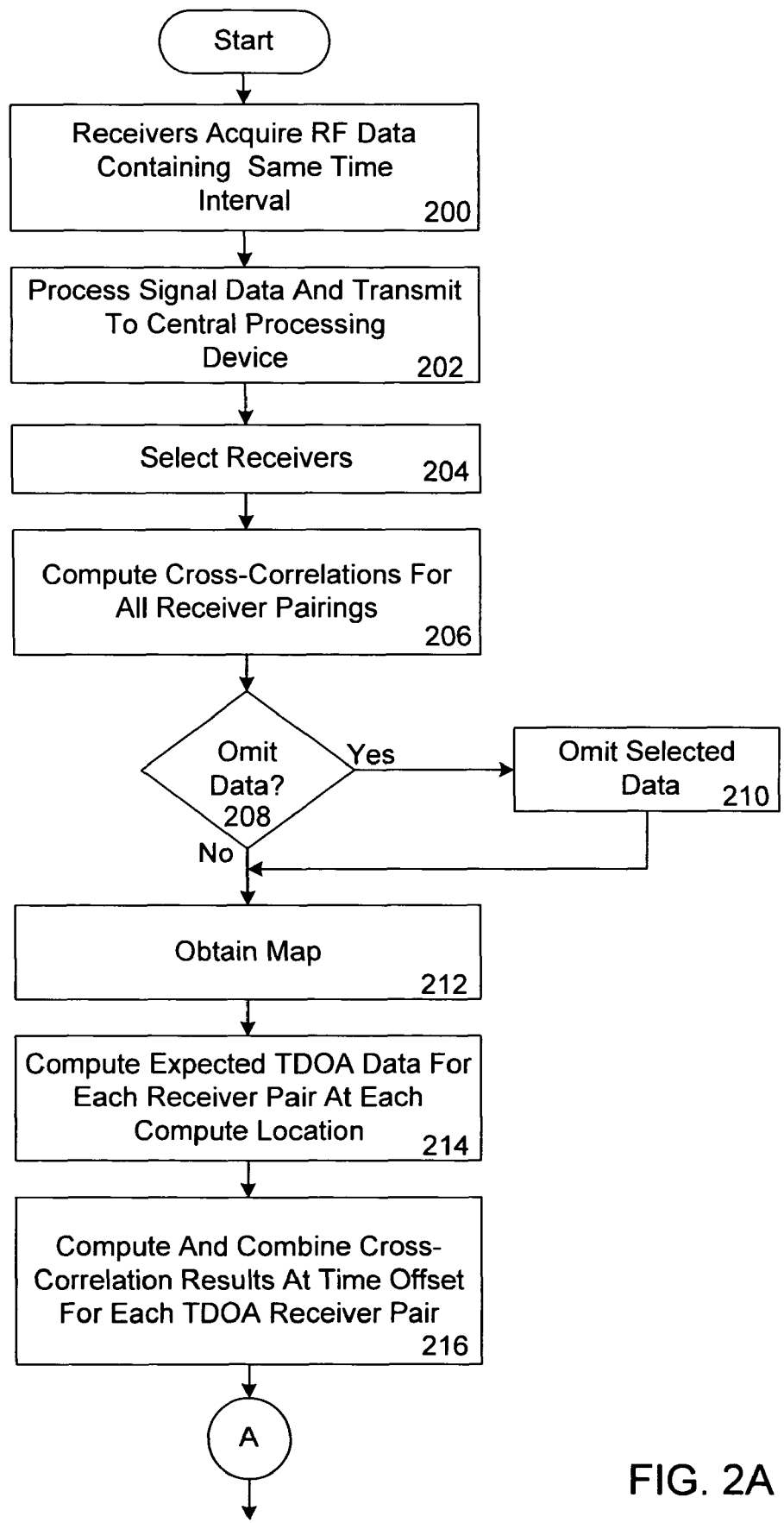
FIGS. 2A-2B illustrate a flowchart of a method for displaying cross-correlation data from a network of receivers in an embodiment in accordance with the invention.
Figure 2B:
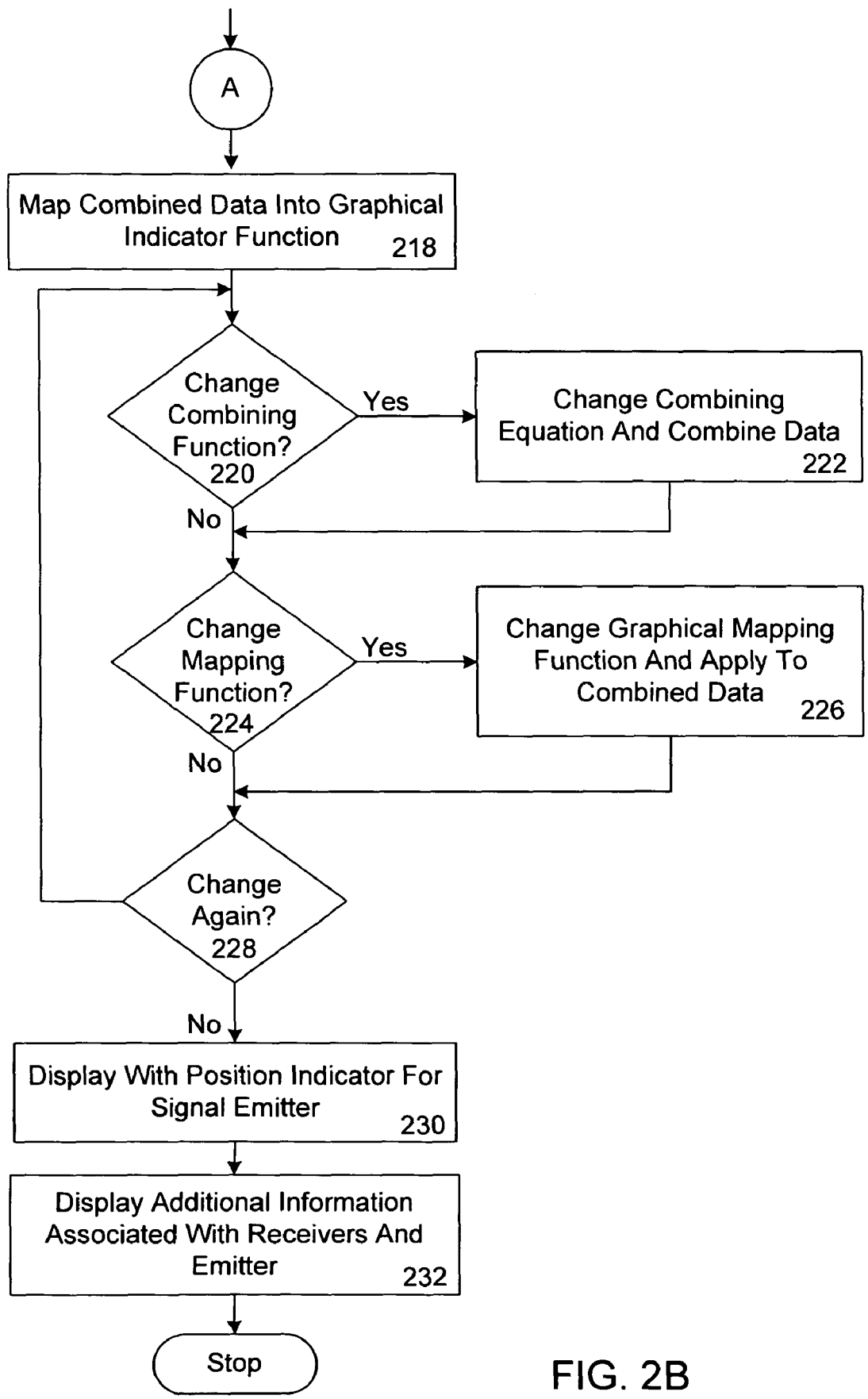

FIGS. 2A-2B illustrate a flowchart of a method for displaying cross-correlation data from a network of receivers in an embodiment in accordance with the invention. Initially all of the receivers acquire signal data encompassing the same time interval, as shown in block 200. Because the receivers are synchronized in time, the receivers will acquire the same signal data associated with the given time period. Each receiver then processes and transmits the data to a central processing device, as shown in block 202. For example, when receiving RF signals, the receivers may downconvert and digitize the signal data, reduce the signal bandwidth and sample rate, and store the digital signal data in memory.

Embodiments in accordance with the invention may use additional or different data processing at block 202. The signal data used in the cross-correlation may have other processing prior to, or as part of the cross-correlation computation. For example, the data may be compensated for frequency and timing errors in the receiver, or Doppler effects from relative motion between the emitter and the receivers.

Next, at block 204, two or more receivers and respective signal data are selected for computation. A user may select a receiver, for example, by highlighting the receiver or receivers with a pointing device such as a mouse or stylus, through a user interface that includes check boxes, pull-down menus, or by entering the coordinates of the receiver. The central processing device then computes the cross-correlations for all possible receiver pairings, as shown in block 206. For example, a network of three receivers produces three receiver pairings while a network of four receivers produces six receiver pairings. A signal may be added to the computed cross-correlation data or to the signal data received from each receiver prior to computing the cross-correlations in an embodiment in accordance with the invention. The added signal can improve the visual impact of the images of location information.

For example, wide-band noise may be added to RF data received from each RF receiver to randomize the image in an embodiment in accordance with the invention. The added signal can improve the separation of the narrowband random noise and the signal of interest. Alternatively, the wide-band noise may prevent the misinterpretation of the images of location data when a signal of interest is not actually present at the receivers.

A determination is then made at block 208 as to whether cross-correlation data from one or more receiver pairings is to be omitted. For example, with three receivers generating three pairings, a user may decide to use two of the three pairings in an embodiment in accordance with the invention.

Alternatively, a user may exclude all pairings associated with one receiver in another embodiment in accordance with the invention.

If a receiver pairing is to be excluded, the method passes to block 210 where the one or more receiver pairings are excluded. To exclude a receiver pairing, a user may, for example, select a specific receiver to be excluded. In another embodiment in accordance with the invention, after reviewing the cross-correlation data, a user may exclude one or more specific correlations.

The method then continues at block 212 where a user selects or inputs a map of an area where location information is to be computed. A user may select or input the, map, for example, by downloading the map or reading the map from a database.

The central processing device computes the expected TDOA data for each selected receiver pairing at block 214. The cross-correlation results (e.g., amplitudes) at the time offset indicated by the TDOA are then computed and combined for each receiver pairing in an embodiment in accordance with the invention (block 216). A combining function is used to combine the correlation results to produce indicator levels. The indicator levels are numerical in an embodiment in accordance with the invention.

The combining function may be algebraic in an embodiment in accordance with the invention. For example, the function could be a mathematical equation, such as, multiplying or adding the correlation results (e.g., amplitudes) to obtain the indicator levels. In other embodiments in accordance with the invention, the function may include programmatic or additional non-linear elements such as thresholding and clipping.

The indicator levels are then mapped into a graphical indicator function, as shown in block 218. In one embodiment of the invention, the indicator levels are converted into one or more colors indicating amplitude. The brightness of the color may vary based on ranges of amplitude values. In another embodiment of the invention, the indicator levels are further processed into contour plots. If the compute location is two-dimensional, latitude and longitude may be used in two and three dimensional plotting techniques, such as those used to plot terrain elevation. Advanced plotting techniques, such as shadowing to enhance viewability, may be used in other embodiments in accordance with the invention. And the results may be displayed in a semi-transparent volume or as a collection of two-dimensional slices in those embodiments that display three dimensional images.

A determination is then made at block 220 as to whether the combining function is to be changed. If so, the method passes to block 222 where the combining function is changed and the correlation results combined with the new combining function. The combining function is changed to enhance the image in an embodiment in accordance with the invention. For example, in a three sensor system, the three amplitudes may be multiplied together and then taken to the ⅓ power in an embodiment in accordance with the invention.

A determination is then made at block 224 as to whether the graphical indicator function is to be changed. If so, the graphical indicator function is changed and the results mapped pursuant to the new function (block 226). For example, in one embodiment in accordance with the invention, mapping the indicator levels into a color is quantized from a first set of possible color (e.g., 16 colors) to a second set of possible colors (e.g., 64 colors). In other embodiments in accordance with the invention, the colors may be ordered based on frequency, in reverse order, or randomly.

A determination is then made at block 228 as to whether the combining function or the graphical indicator function should be changed again. If so, the method returns to block 220. When the combining and graphical indicator functions are not changed, the process continues at block 230 where the mapped results are displayed on a map with a position indicator indicating the expected location of the signal emitter.

Additional information associated with the receivers and the signal emitter may also be displayed, either simultaneously or upon command, as shown in block 232. For example, in one embodiment in accordance with the invention, coordinates for the location of the signal emitter are displayed. In another embodiment in accordance with the invention, the receiver locations are displayed with the location of the signal emitter. FIGS. 5-9 illustrate other types of additional information that may be displayed to a user.

Embodiments in accordance with the invention are not limited to the blocks shown in FIGS. 2A-2B and their order. Blocks may be added, moved, or deleted in other embodiments in accordance with the invention. By way of example only, blocks 220, 222, 224, 226, 228 may be omitted in another embodiment in accordance with the invention.

Figure 3:
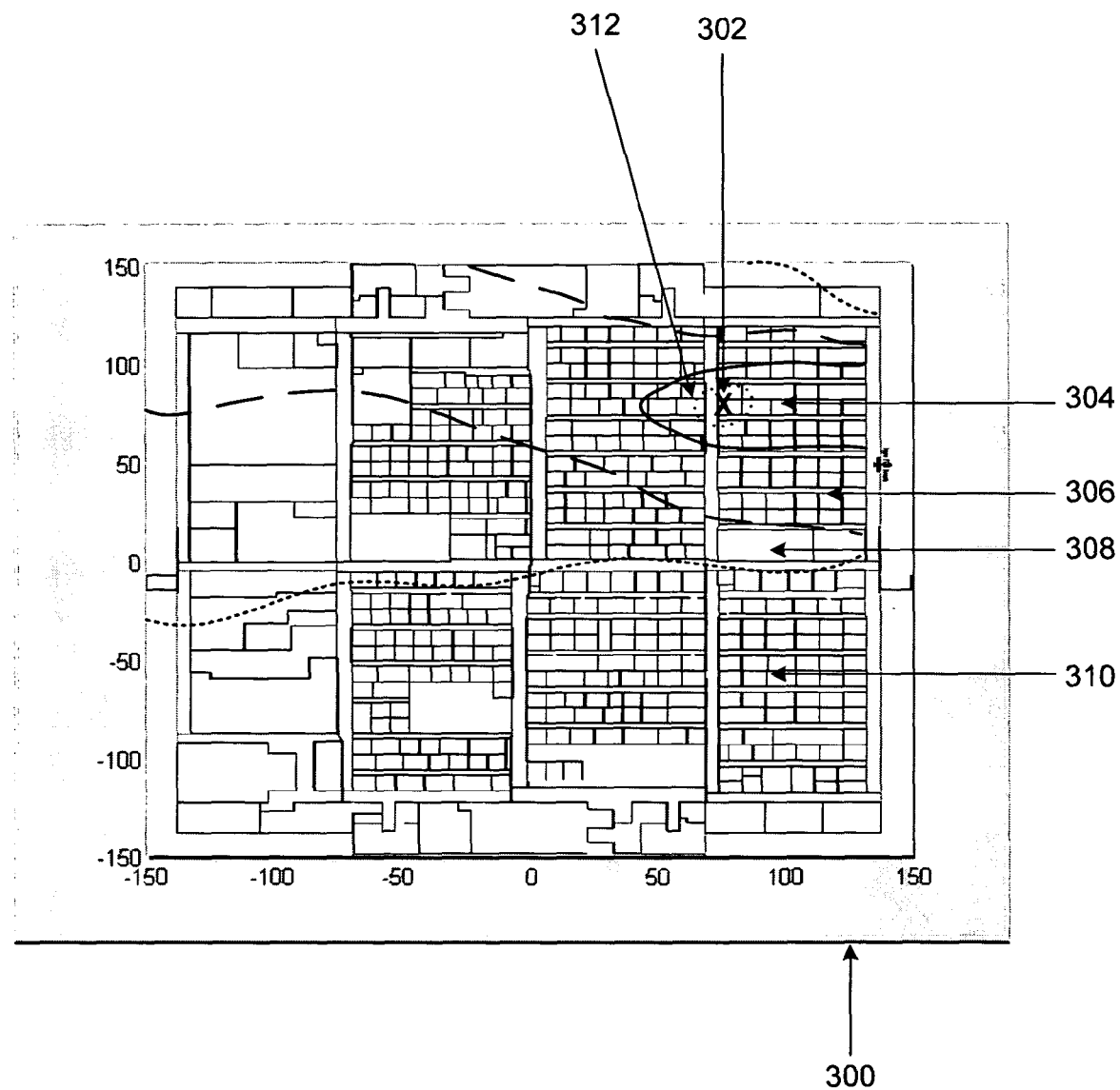
FIG. 3 is a diagrammatic illustration of a first image of location information in an embodiment in accordance with the invention.

Referring to FIG. 3, there is shown a diagrammatic illustration of a first image of location information in an embodiment in accordance with the invention. Image 300 displays a floor plan for a portion of a building. Other embodiments in accordance with the invention are not limited to this display. An image may display any given area. For example, an image of a neighborhood, one or more buildings, and cities may be displayed to a user.

An "X" 302 is used to indicate the estimated location of a signal emitter and regions 304, 306, 308, 310 graphically illustrate regions of varying amplitudes in an embodiment in accordance with the invention. The "X" position 302 is determined from the data at the output of the combining function, or from the cross-correlation data using more traditional TDOA computations in embodiments in accordance with the invention. Regions 304, 306, 308, 310 may be mapped into different colors, such as red, green, yellow, and blue, respectively, in an embodiment in accordance with the invention. Moreover, the brightness of each color may vary as the amplitude decreases as the distance from location 302 increases.

In an embodiment in accordance with the invention, the line attributes for each line surrounding a region are used to indicate additional information relating to signal characteristics and accuracy. Attributes such as width, color, and style, may be varied to indicate cross-correlation level, cross-correlation width (of the peak), or other parameters affecting accuracy. For example, the different line styles shown in FIG. 3 may represent different cross-correlation levels.

In another embodiment in accordance with the invention, region 304 may be assigned two contrasting colors and regions 306, 308, 310 one color representing a range of values for the amplitude. For example, region 304 may use the color black for a range of strongest or highest values and the color red for the remaining values. Areas for the two contrasting colors within region 304 are indicated by the dotted line 312.

And in yet another embodiment in accordance with the invention, regions 304, 306, 308, 310 may include contouring lines similar to those used in topology maps. For example, a number of closely spaced lines may be drawn in region 302, where the distance between each line is related to the amplitudes. The larger the amplitude, the closer the lines are drawn to one another. Regions 304, 306, 308, 310 may each display less closely spaced lines indicating the amplitude is decreasing as the distance from region 302 becomes greater.

Figure 4:
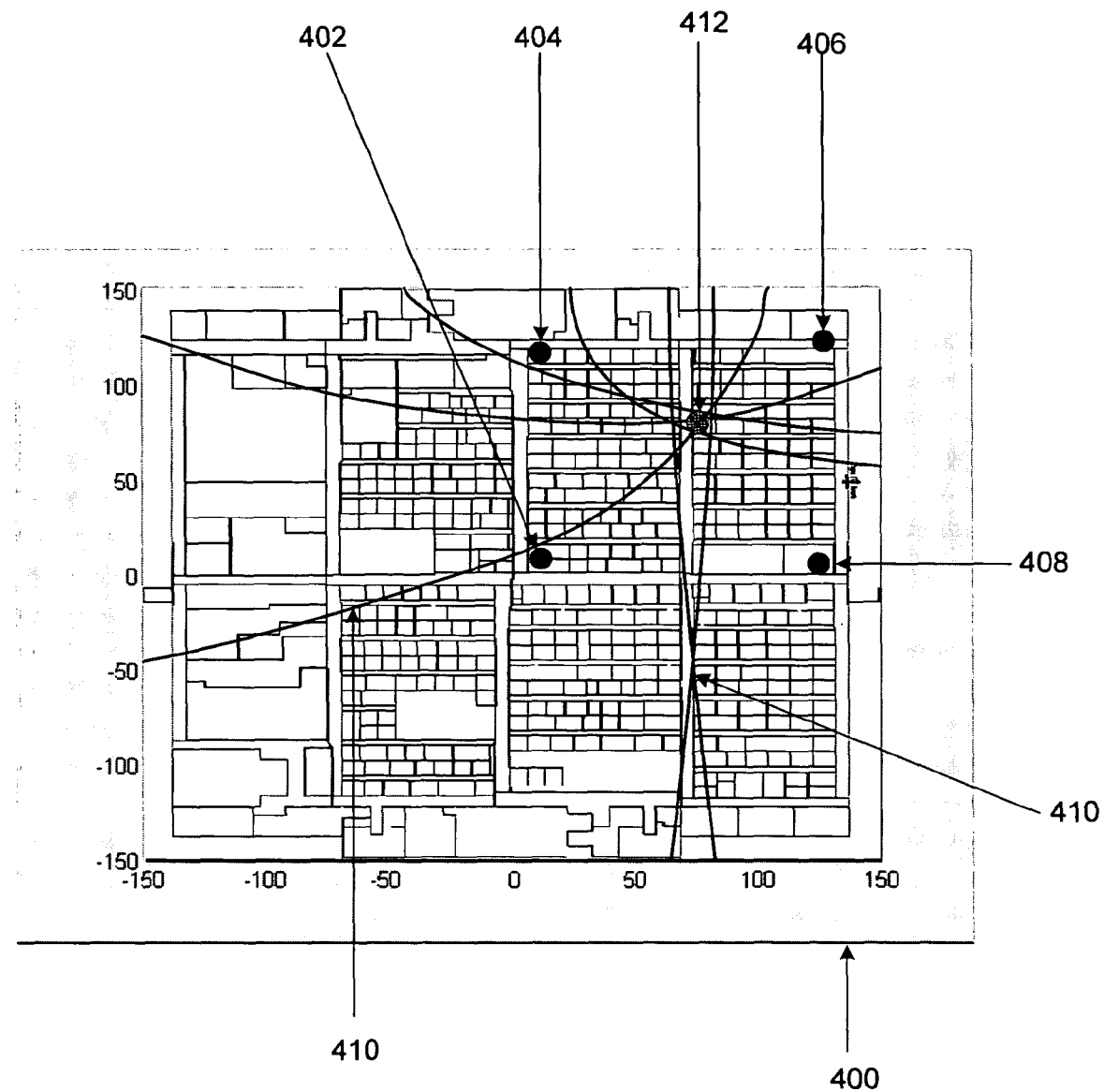
FIG. 4 is a diagrammatic illustration of a second image of location information in an embodiment in accordance with the invention.

FIG. 4 is a diagrammatic illustration of a second image of location information in an embodiment in accordance with the invention. Image 400 has been generated for four receivers positioned at locations 402, 404, 406, 408. Hyperbolic lines 410 representing the most likely time difference, or differences, of arrival data measured from expected signal emitter location 412 are plotted in image 400. The time difference may be computed automatically, such as by indicating the time offset of the correlation peak, in an embodiment in accordance with the invention. In another embodiment in accordance with the invention, the time difference may be entered by the user, such as, for example, by selecting particular points on one or more correlation waveforms with a stylus or a mouse to indicate the time offset.

The spacing between each hyperbolic line represents a given time difference, such as, for example, 600 nanoseconds. One or more line attributes such as width, color, and style may be varied for each hyperbolic line to indicate additional information. For example, one or more line attributes may indicate cross-correlation level, cross-correlation width (of the peak), or other parameters affecting accuracy in an embodiment in accordance with the invention.

FIG. 4 illustrates additional information that may be displayed to a user. The locations of the receivers 402, 404, 406, 408 and hyperbolic lines 410 are included with an expected location of a signal emitter 412. In another embodiment in accordance with the invention, image 400 may also be combined with image 300 of FIG. 3. Thus, regions 304, 306, 308, 310 would be illustrated in FIG. 4. In another embodiment in accordance with the invention, a map or floor plan is not illustrated with regions 304, 306, 308, 310, the locations of the receivers 402, 404, 406, 408, hyperbolic lines 410, and an expected location of a signal emitter 412.

In other embodiments in accordance with the invention, other location information may be displayed to a user. For example, the coordinates of the compute locations or icons representing the compute locations may be displayed, the time, spectrum, and cross-correlation waveforms may be shown, a grid of longitude and latitude lines may overlay the image, and the location of a cursor moving over the image or map may be displayed to a user.

Figure 5:
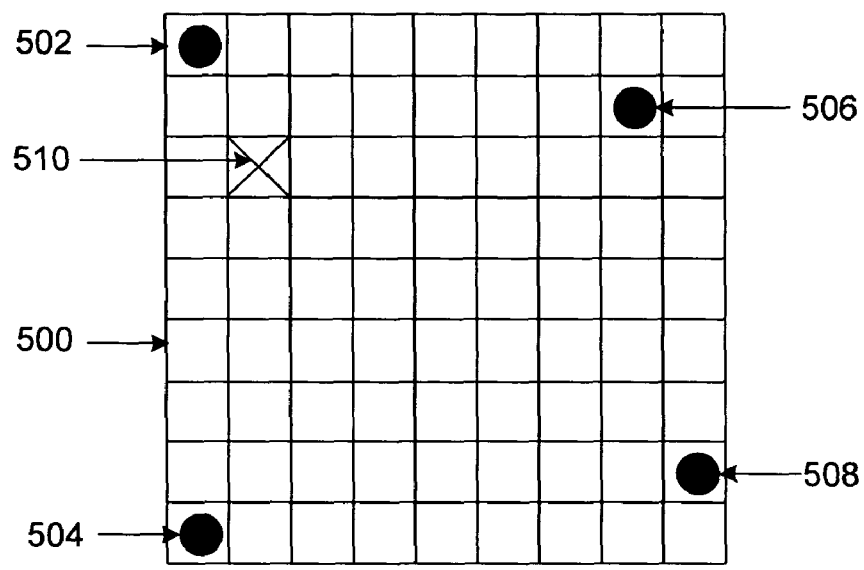
FIG. 5 is a diagrammatic illustration of a method for generating the image shown in FIG. 3 in an embodiment in accordance with the invention.
Figure 6:
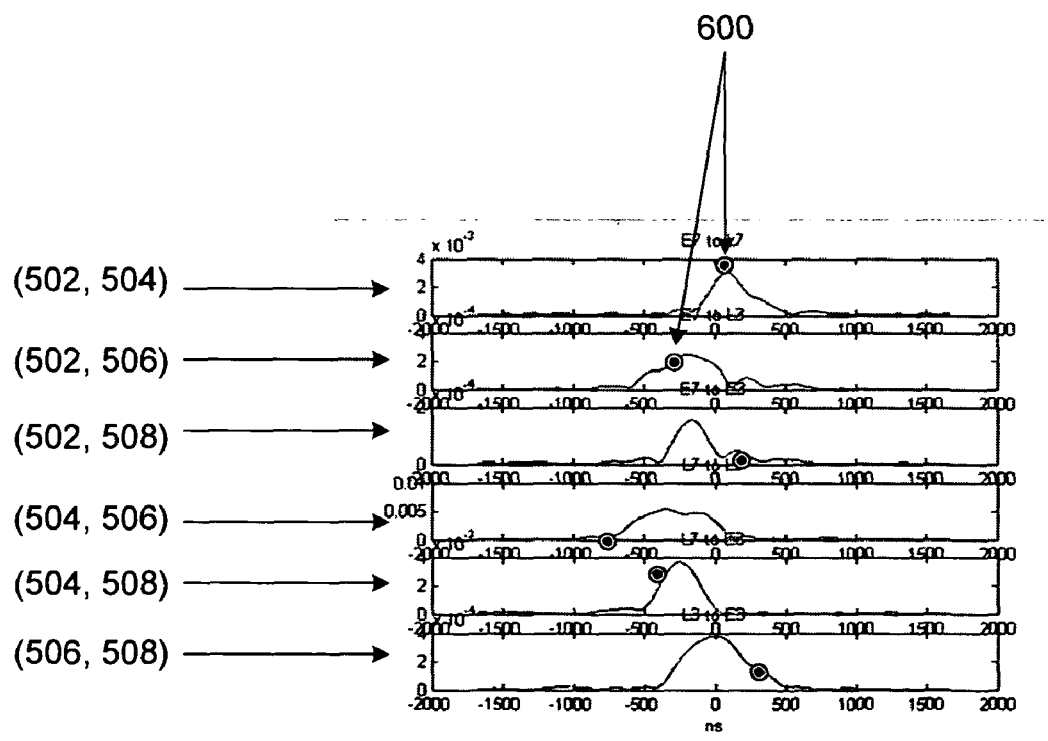
FIG. 6 depicts correlation data for TDOA values corresponding to the receiver pairings shown in FIG. 5.

Referring to FIG. 5, there is shown a diagrammatic illustration of a method for generating the image shown in FIG. 3 in an embodiment in accordance with the invention. Each square in grid 500 represents a compute location that corresponds to a pixel on a display screen in an embodiment in accordance with the invention. In other embodiments in accordance with the invention, the compute locations can follow any arrangement and are not limited to rectangular grids.

Receivers are positioned at locations 502, 504, 506, 508 in grid 500. Location 510 is a known distance from the receivers at locations 502, 504, 506, 508. Using the distance information combined with the known rate of propagation of a signal through the medium, the expected TDOA's can be computed for each receiver pairing. For each corresponding cross-correlation, the TDOA relates directly to the horizontal position of points 600 in FIG. 6. The values of the correlations at points 600 are combined and mapped into a graphical indicator function (e.g., assigned a color) which is then displayed at 510. This process is repeated for all compute locations in grid 500.

Figure 7:
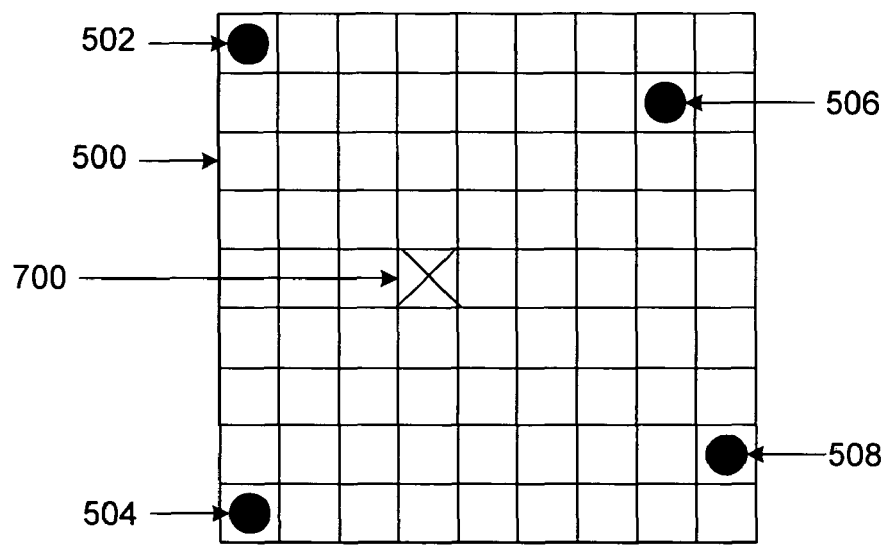
FIG. 7 is a diagrammatic illustration of a fourth image of location information in an embodiment in accordance with the invention.

FIG. 7 is a third image of location information in an embodiment in accordance with the invention. FIG. 7 illustrates grid 500 from FIG. 5, which is used to illustrate some of the additional information that may be displayed at block 230 in FIG. 2B. Location 700 is selected, for example, by placing a cursor over location 700 and clicking a mouse button in one embodiment in accordance with the invention. In other embodiments in accordance with the invention, the coordinates for location 700 may be read from a database, downloaded from a server, or entered into a user interface by a user. The additional information displayed to the user includes the cross-correlation waveforms and the spectra for each receiver.

Figure 8:
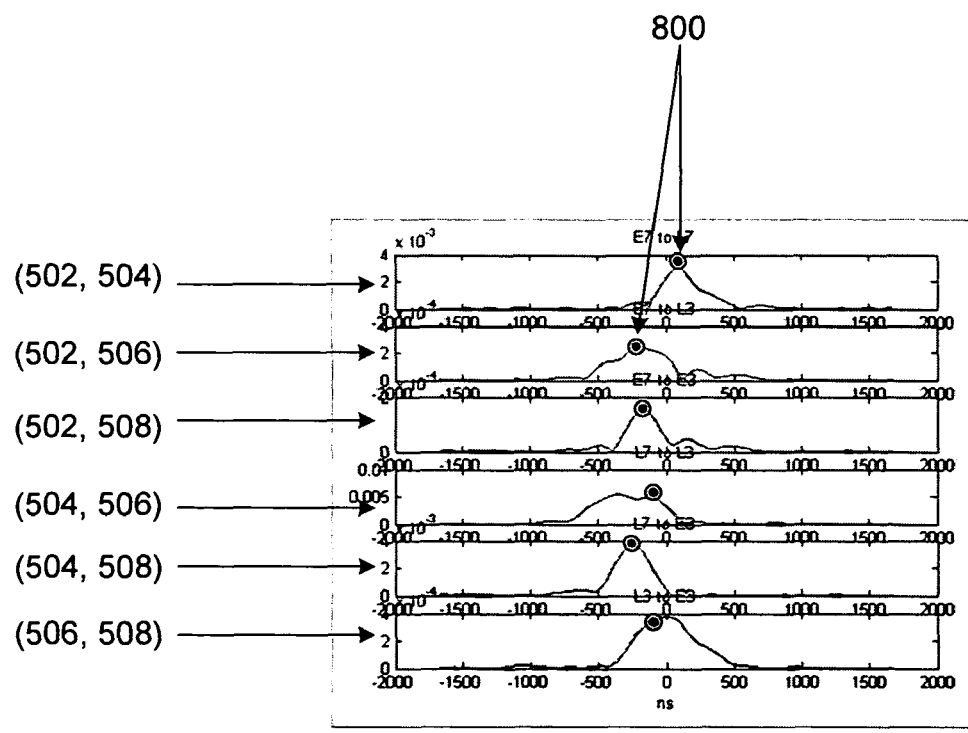
FIG. 8 depicts cross-correlation waveforms corresponding to the receiver pairings shown in FIG. 5.

FIG. 8 depicts cross-correlation waveforms corresponding to the receiver pairings shown in FIG. 5. Points 800 shown in each waveform indicate the calculated TDOA for each receiver pairing at location 700 in FIG. 7.

Figure 9:
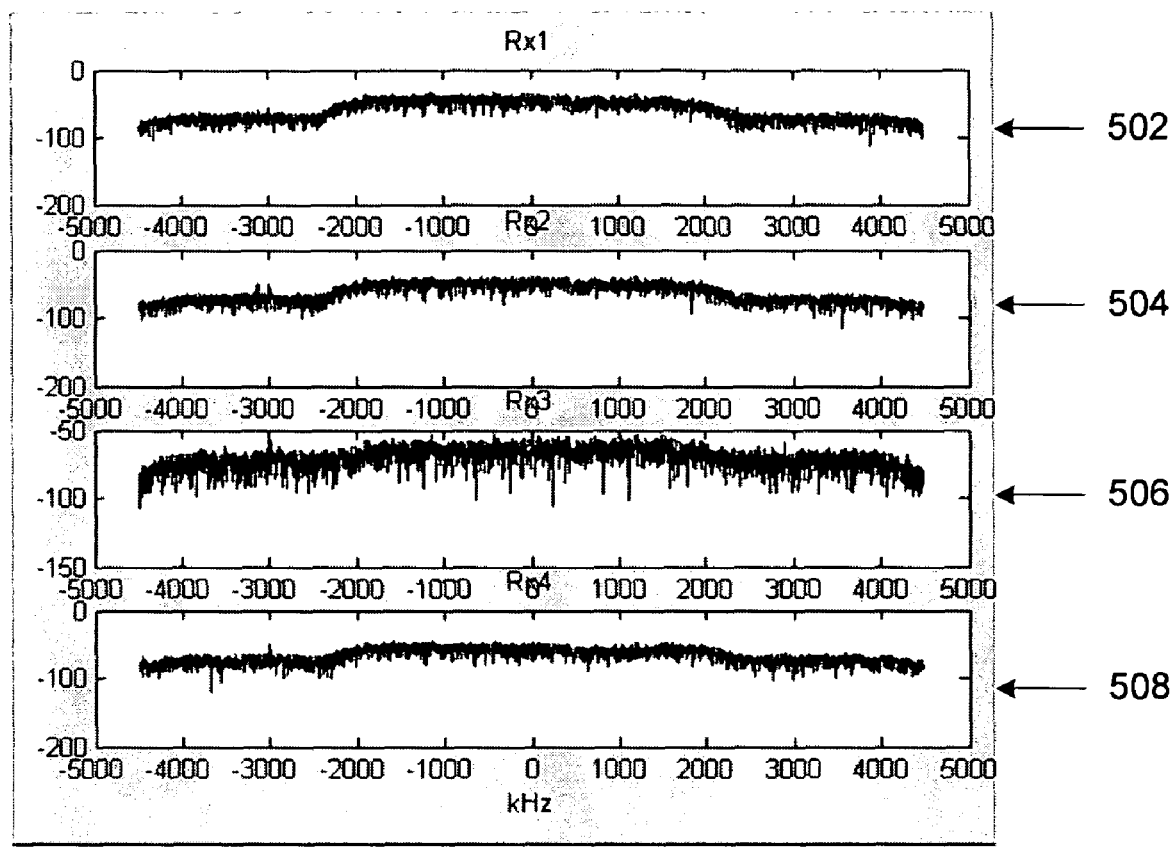
FIG. 9 depicts spectrum data for the receivers shown in FIG. 5.

FIG. 9 depicts spectrum data for the receivers shown in FIG. 5. The spectra for each receiver 502, 504, 506, 508 are shown in the graphs.

Although FIGS. 4, 5, 6, and 8 depict a floor plan for a portion of a building, other embodiments in accordance with the invention may display different information, including, but not limited to, a geographical area of a street, neighborhood, city, county, and state. Additionally, the images of location information are not limited to two dimensional images. Embodiments in accordance with the invention may display three dimensional images of location information. A three-dimensional image may depict a building or volume in an embodiment in accordance with the invention.

The invention claimed is:

1. A method for displaying information related to potential locations of a signal emitter, said method comprising:
   obtaining first and second signals from first and second receivers, spaced apart from one another, respectively, as a function of time, in response to a transmitted signal from said signal emitter;
   for each of a plurality of compute locations, computing a first expected time difference of arrival (TDOA) value corresponding to that compute location and the distance between that compute location and each of said first and second receivers, and generating an indicator level that depends on a value of a first cross-correlation function of said obtained first and second signals offset in time at the offset time indicated by said first expected TDOA value;
   mapping said indicator levels into a graphical indicator function; and
   displaying a result of the graphical indicator function for each of the plurality of compute locations.

2. The method of claim 1, further comprising obtaining a third signal as a function of time from a third receiver, spaced apart from said first and second receivers, in response to said transmitted signal; and
   for each of said plurality of compute locations, computing a second expected time difference of arrival (TDOA) value corresponding to that location and the distance between that location and each of said first and third receivers,
   wherein said generated indicator level for that compute location depends on combining the value of said first cross correlation function of said first and second signals offset in time at the offset time indicated by said first expected TDOA value for that compute location with the value of a second cross-correlation function of said first and third signals offset in time at the offset time indicated by said second expected TDOA value corresponding to that compute location.

3. The method of claim 2, further comprising at each compute location changing how the indicator level is generated from combining the values of the first and second cross-correlation functions offset in time at the offset times indicated by the respective first and second expected TDOA values.

4. The method of claim 3, further comprising changing how the generated indicator levels are mapped into the graphical indicator function.

5. The method of claim 2, further comprising:
   selecting one of the plurality of compute locations; and
   displaying additional information associated with at least the first, second and third receivers.

6. The method of claim 5, wherein the additional information associated with at least the first, second and third receivers comprises at least one of a location of each receiver, a spectrum waveform for each receiver, a location of the signal emitter, one or more hyperbolic lines representing the expected TDOA values computed for each receiver pair, and a cross-correlation waveform for each receiver pair.

7. The method of claim 6, further comprising varying one or more line attributes of the hyperbolic lines to display the additional information.

8. The method of claim 2, further comprising:
   selecting one of the plurality of compute locations; and
   displaying the waveforms of the first and second cross-correlation functions of offset time at the selected compute location; and
   indicating the cross correlation value on each cross correlation waveform at the offset time corresponding to the respective expected TDOA value.

9. The method of claim 1, wherein mapping said indicator levels into a graphical indicator function comprises converting the indicator levels into one or more colors.

10. The method of claim 6, wherein mapping the indicator levels into one or more colors comprises mapping the indicator levels into one or more colors that indicate a range of values.

11. The method of claim 10, wherein a range of values representing the top range of values is mapped into a first color and a second contrasting color, where the first color represents the highest values and the second contrasting color represents the remaining values.

12. The method of claim 1, wherein mapping indicator levels into one or more colors comprises processing the indicator levels into contour lines.

13. The method of claim 1, further comprising displaying additional information associated with the signal emitter.

14. The method of claim 1, further comprising adding a signal to at least one of the first and the second signals and the first cross-correlation function of offset time.

* * * * *

UNITED STATES PATENT AND TRADEMARK OFFICE
CERTIFICATE OF CORRECTION

| | | |
|---|---|---|
| PATENT NO. | : 7,869,810 B2 | Page 1 of 1 |
| APPLICATION NO. | : 11/114314 | |
| DATED | : January 11, 2011 | |
| INVENTOR(S) | : Robert T. Cutler et al. | |

It is certified that error appears in the above-identified patent and that said Letters Patent is hereby corrected as shown below:

In column 8, line 40, in Claim 10, delete "claim 6," and insert -- claim 9, --, therefor.

Signed and Sealed this
Fifth Day of April, 2011

David J. Kappos
*Director of the United States Patent and Trademark Office*